(12) United States Patent
Paulino et al.

(10) Patent No.: US 11,384,841 B2
(45) Date of Patent: Jul. 12, 2022

(54) BRUSH SEAL WITH CROSSING BRISTLES

(71) Applicant: United Technologies Corporation, Farmington, CT (US)

(72) Inventors: Jose R. Paulino, Saco, ME (US); Neil L. Tatman, Brentwood, NH (US); Paul J. Burgess, Kennebunk, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 128 days.

(21) Appl. No.: 16/706,183

(22) Filed: Dec. 6, 2019

(65) Prior Publication Data

US 2021/0172527 A1   Jun. 10, 2021

(51) Int. Cl.
*F16J 15/3288*   (2016.01)

(52) U.S. Cl.
CPC ................................ *F16J 15/3288* (2013.01)

(58) Field of Classification Search
CPC .... F16J 15/00; F16J 15/02; F16J 15/46; F16J 15/48; F16J 15/3268; F16J 15/3288
USPC ........................................................ 277/355
See application file for complete search history.

(56) References Cited

U.S. PATENT DOCUMENTS

| | | | | |
|---|---|---|---|---|
| 5,335,920 A * | 8/1994 | Tseng | ................... | F16J 15/3288 277/303 |
| 6,308,957 B1 | 10/2001 | Wright | | |
| 6,681,486 B2 * | 1/2004 | Flower | ................. | F16J 15/3268 29/521 |
| 7,052,015 B2 * | 5/2006 | Addis | ................... | F16J 15/002 277/355 |
| 7,182,345 B2 * | 2/2007 | Justak | ..................... | F01D 11/00 277/355 |
| 9,863,538 B2 * | 1/2018 | Duguay | ............... | F16J 15/3288 |
| 10,208,674 B2 | 2/2019 | Lutjen | | |
| 10,393,270 B2 * | 8/2019 | Davis | .................... | F01D 11/005 |
| 2005/0006851 A1 * | 1/2005 | Addis | .................. | F16J 15/3288 277/355 |
| 2016/0040600 A1 * | 2/2016 | Lutjen | ..................... | F01D 11/02 60/805 |
| 2017/0292609 A1 * | 10/2017 | Drake | ................... | F01D 11/001 |
| 2017/0306782 A1 * | 10/2017 | Shah | ..................... | F16J 15/3292 |
| 2019/0063248 A1 * | 2/2019 | Rogers | ................. | F01D 11/005 |
| 2019/0309856 A1 | 10/2019 | Drake | | |

FOREIGN PATENT DOCUMENTS

GB   2355049 A   12/1999
KR   101638480 B1   7/2016

OTHER PUBLICATIONS

EP search report for EP20211554.9 dated Apr. 12, 2021.

* cited by examiner

*Primary Examiner* — Nathan Gumar
(74) *Attorney, Agent, or Firm* — Getz Balich LLC

(57) ABSTRACT

A seal joint assembly is provided that includes a stationary seal carrier, a stationary seal land and a brush seal. The stationary seal land includes a seal land surface. The brush seal is mounted to the stationary seal carrier. The brush seal includes a first set of bristles and a second set of bristles. The first set of bristles includes a first bristle that contacts the seal land surface. The second set of bristles includes a second bristle that contacts the seal land surface. The second bristle crosses the first bristle.

20 Claims, 9 Drawing Sheets

BRUSH SEAL WITH CROSSING BRISTLES

BACKGROUND OF THE DISCLOSURE

1. Technical Field

This disclosure relates generally to a seal joint and, more particularly, to a seal joint configured with a brush seal.

2. Background Information

Various types and configurations of seal joints are known in the art. One known seal joint includes a brush seal that seals a gap between two adjacent components. A typical annular brush seal includes a plurality of bristles arranged in a common circumferential direction about an axis. Distal ends of these bristles are adapted to contact a surface of a seal land during normal operation. However, when a pressure differential across the brush seal increases above a threshold, the bristles may bend back and disengage from the seal land surface thereby allowing leakage across the seal. This bending of the bristles and disengagement from the seal land surface may be referred to as blow through.

There is a need in the art to provide a more robust brush seal without, for example, requiring increasing size of the brush seal and/or size of its bristles.

SUMMARY OF THE DISCLOSURE

According to an aspect of the present disclosure, a seal joint assembly is provided that includes a stationary seal carrier, a stationary seal land and a brush seal. The stationary seal land is configured as or otherwise includes a seal land surface. The brush seal is mounted to the stationary seal carrier. The brush seal includes a first set of bristles and a second set of bristles. The first set of bristles includes a first bristle that contacts the seal land surface. The second set of bristles includes a second bristle that contacts the seal land surface, and the second bristle crosses the first bristle.

According to another aspect of the present disclosure, a brush seal is provided that includes a bottom plate, a top plate and a plurality of bristles. The bottom plate extends circumferentially around a centerline. The top plate extends circumferentially around the centerline and circumscribes the bottom plate. The bristles are secured at a joint radially between the bottom plate and the top plate. The bristles include a first set of bristles and a second set of bristles. The first set of bristles include a first bristle that extends to an axial distal end of the brush seal. The second set of bristles include a second bristle that extends to the axial distal end of the brush seal. The second bristle circumferentially and axially overlaps the first bristle. The second bristle is angularly offset from the first bristle by an angle.

According to still another aspect of the present disclosure, another brush seal is provided that includes a first side plate, a second side plate and a plurality of bristles. The first side plate extends circumferentially around a centerline. The second side plate extends circumferentially around the centerline. The bristles are secured at a joint axially between the first side plate and the second side plate. The bristles include a first set of bristles and a second set of bristles. The first set of bristles includes a first bristle that extends to a radial inner distal end of the brush seal. The second set of bristles includes a second bristle that extends to the radial inner distal end of the brush seal. The second bristle circumferentially and radially overlaps the first bristle. The second bristle is angularly offset from the first bristle by an angle.

Each bristle in the first set of bristles may be laid in a first circumferential direction about the centerline at a first bristle lay angle. Each bristle in the second set of bristles may be laid in a second circumferential direction about the centerline at a second bristle lay angle that is equal to and opposite of the first bristle lay angle. In addition or alternatively, the second bristle lay angle may be of different direction and/or magnitude than the first bristle lay angle.

The brush seal may extend circumferentially about a centerline. The second bristle may circumferentially and/or axially overlap the first bristle.

The brush seal may extend circumferentially about a centerline. The second bristle may circumferentially and/or radially overlap the first bristle.

The second bristle may be angularly offset from the first bristle by an acute angle.

The second bristle may be angularly offset from the first bristle by an obtuse angle.

The second bristle may be angularly offset from the first bristle by a right angle.

The brush seal may extend circumferentially about a centerline. The first set of bristles may be laid in a first circumferential direction about the centerline. The second set of bristles may be laid in a second circumferential direction about the centerline that is opposite the first circumferential direction. In addition or alternatively, the second circumferential direction may have a different magnitude than the first circumferential direction.

The first bristle may be laid in the first circumferential direction about the centerline with a first bristle lay angle. The second bristle may be laid in the second circumferential direction about the centerline with a second bristle lay angle that is equal to and opposite of the first bristle lay angle. In addition or alternatively, the second bristle lay angle may be of different direction and/or magnitude than the first bristle lay angle.

The brush seal may extend circumferentially about a centerline. The brush seal may extend axially between the stationary seal carrier and the stationary seal land.

The brush seal may extend circumferentially about a centerline. The brush seal may extend radially between the stationary seal carrier and the stationary seal land. The stationary seal carrier may circumscribe the stationary seal land.

The brush seal may also include a first plate and a second plate. The first set of bristles and the second set of bristles may be secured at a joint between the first plate and the second plate.

A first component of a gas turbine engine may be included, and the first component may be configured as or otherwise include the stationary seal carrier. A second component of the gas turbine engine may be included, and the second component may be configured as or otherwise include the stationary seal land.

The angle may be an acute angle.

The angle may be an obtuse angle.

The angle may be a right angle.

The first set of bristles may be laid in a first circumferential direction about the centerline. The second set of bristles may be laid in a second circumferential direction about the centerline that is opposite the first circumferential direction.

The first bristle may be laid in the first circumferential direction about the centerline with a first bristle lay angle. The second bristle may be laid in the second circumferential direction about the centerline with a second bristle lay angle that is equal to and opposite of the first bristle lay angle. In addition or alternatively, the second bristle lay angle may be of different direction and/or magnitude than the first bristle lay angle.

The present disclosure may include any one or more of the features disclosed above and/or below alone or in any combination thereof.

The foregoing features and the operation of the invention will become more apparent in light of the following description and the accompanying drawings.

DETAILED DESCRIPTION

Figure 1:
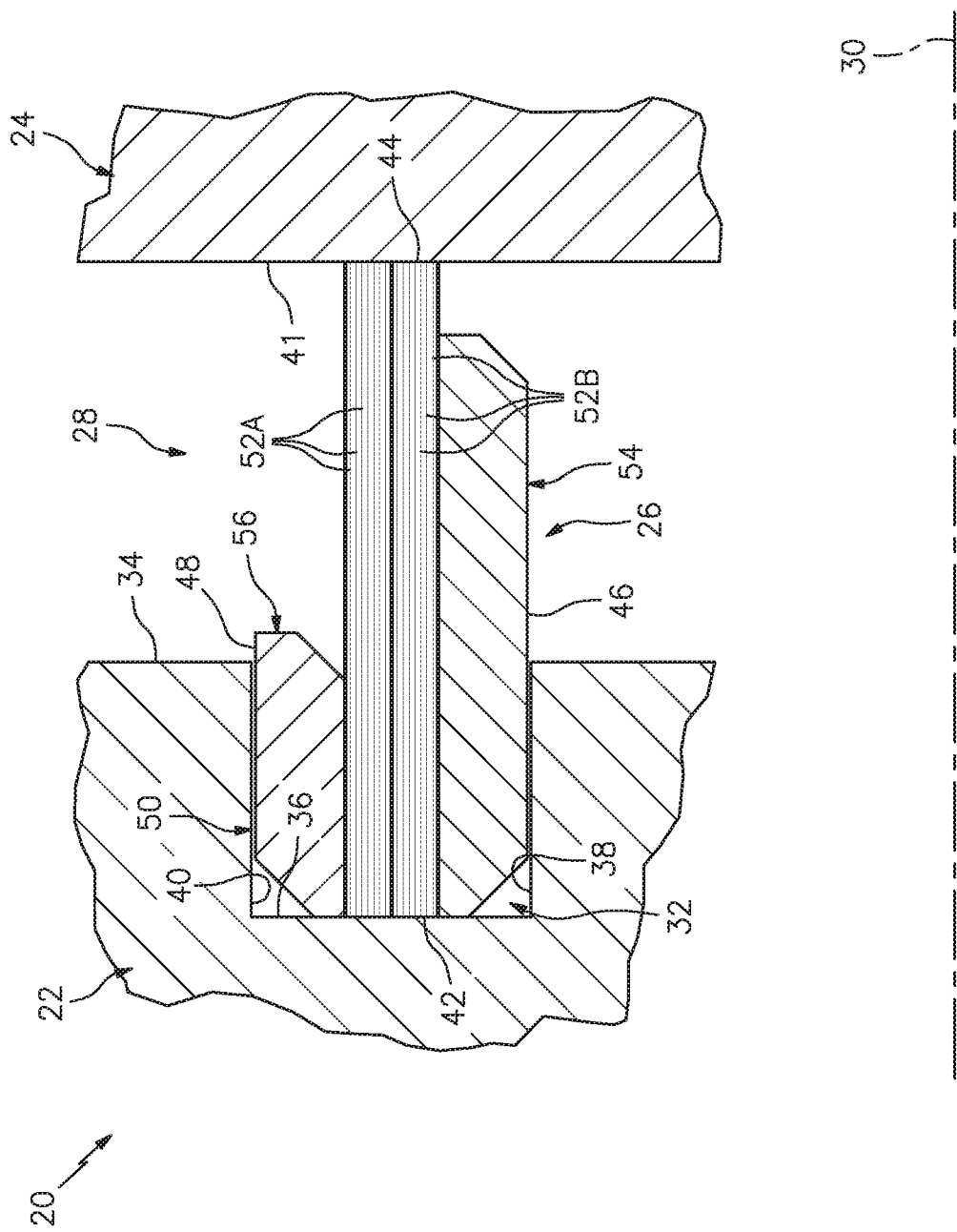
FIG. 1 is a partial side sectional illustration of a seal joint assembly with an axial seal joint.

FIG. 1 illustrates a seal joint assembly 20 for equipment such as, but not limited to, rotational equipment. An example of such rotational equipment is a gas turbine engine for an aircraft propulsion system, an exemplary embodiment of which is described below in further detail with respect to FIG. 12. The seal joint assembly 20 of the present disclosure, however, is not limited to such an aircraft application nor a gas turbine engine application. The seal joint assembly 20, for example, may alternatively be configured with rotational equipment such as an industrial gas turbine engine, a wind turbine, a water turbine or any other piece of equipment in which a brush seal is provided to seal a gap between a plurality of components.

The seal joint assembly 20 includes a seal carrier 22, a seal land 24 and a brush seal 26. The brush seal 26 is configured to seal a gap 28 between the seal carrier 22 and the seal land 24.

The seal carrier 22 extends circumferentially about (e.g., completely around) an axial centerline 30 of the equipment, which centerline 30 may be coaxial with a rotational axis for one or more components in the equipment. The seal carrier 22 may be configured as a stationary body within the equipment. Note, the term "stationary" is used herein to describe a body which is substantially or completely fixed in position and does not rotate about a rotational axis; e.g., the axial centerline 30. However, a stationary body may be subject to slight movements (e.g., shifts) due to, for example, vibrations, thermal expansion, etc. The seal carrier 22, for example, may be fixedly connected to or an integral part of a static structure such as, but not limited to, a strut or a case.

The seal carrier 22 is configured to support the brush seal 26 within the equipment. The seal carrier 22 of FIG. 1, for example, is configured with an annular notch 32 for receiving the brush seal 26. This notch 32 extends circumferentially about (e.g., completely around) the centerline 30 through the seal carrier 22. The notch 32 extends axially into the seal carrier 22 from an axial distal side 34 of the seal carrier 22 to a notch end surface 36. The notch 32 further extends radially within the seal carrier 22 between opposing (e.g., inner and outer) notch side surfaces 38 and 40, where the notch end surface 36 extends radially between and meets the notch side surfaces 38 and 40 at inner and outer interior corners of the notch 32.

The seal land 24 extends circumferentially about (e.g., completely around) centerline 30. The seal land 24 may be configured as a stationary body within the equipment. The seal carrier 22, for example, may be fixedly connected to a static structure such as, but not limited to, a blade outer air seal (BOAS), a shroud or a platform.

The seal land 24 is configured with a seal land surface 41 configured to face the seal land 24 and engage the brush seal 26. The seal land surface 41 of FIG. 1 is located at (e.g., on, adjacent or proximate) an axial distal side of the seal land 24. The seal land surface 41 is an annular, planar surface that is arranged perpendicular to the centerline 30. The seal land surface 41 may be circumferentially and/or radially uninterrupted. The seal land surface 41, for example, may extend circumferentially around the centerline 30 and/or radially between opposing edges of the seal land surface 41 without any breaks; e.g., apertures and/or protrusions. The present disclosure, of course, is not limited to such an exemplary seal land surface configuration.

The brush seal 26 extends circumferentially about (e.g., completely around) the centerline 30. The brush seal 26 extends axially along the centerline 30 between an axial first distal end 42 and an axial second distal end 44. The brush seal 26 extends radially between a radial inner side 46 and a radial outer side 48.

The brush seal 26 includes a mount 50 and a plurality of bristles 52A and 52B (generally referred to as "52"). The mount 50 is disposed at the axial first distal end 42 of the brush seal 26 and configured to hold the bristles 52. The mount 50 may also be configured to secure the brush seal 26 with the seal carrier 22; e.g., be received within the notch 32.

Figure 2:
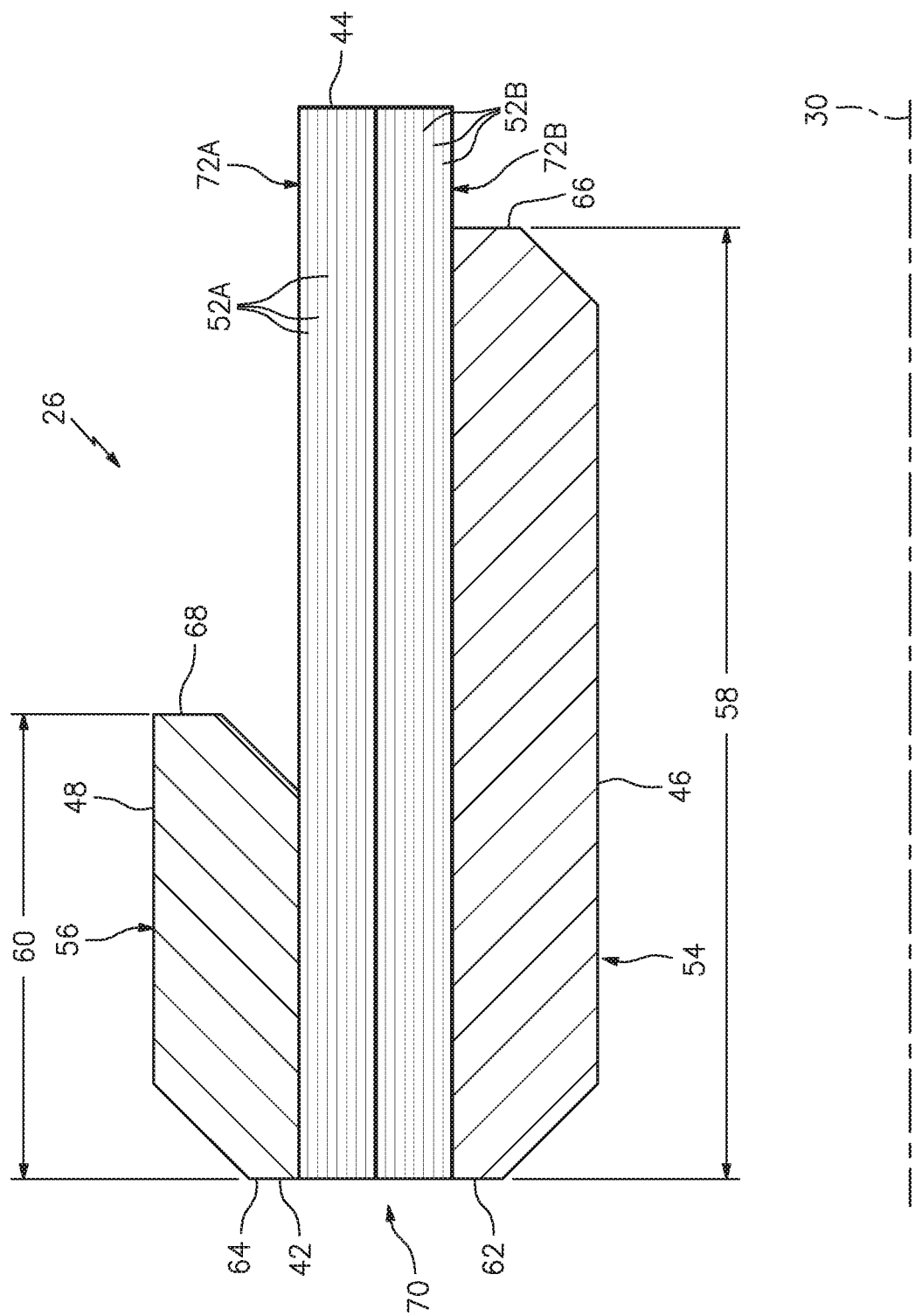
FIG. 2 is a partial side sectional illustration of an annular brush seal.

The mount 50 of FIG. 2 includes a first side plate 54 and a second side plate 56. The side plates 54 and 56 of FIG. 2 are configured as discrete bodies. However, in other embodiments, the side plates 54 and 56 may be included in a unitary body. For example, the mount 50 may have a U-shaped body with an intermediate portion/bridge that extends (e.g., radially) between and interconnects the side plates 54 and 56.

Each side plate 54, 56 may have a tubular body. Each of the side plates 54 and 56, for example, extends circumferentially about (e.g., completely around) the centerline 30. Each of the side plates 54 and 56 extends axially along the centerline 30 between opposing first plate end 62, 64 and second plate end 66, 68. The first side plate 54 is disposed at the radial inner side 46 and radially within the second side plate 56. The first side plate 54 of FIG. 2 may therefore be referred to as a bottom plate. The second side plate 56 is disposed at the radial outer side 48 and circumscribes the first side plate 54. The second side plate 56 of FIG. 2 may therefore be referred to as a top plate.

An axial length 58 of the first side plate 54 may be greater than an axial length 60 of the second side plate 56. However, in other embodiments, the axial length 58 may alternatively be equal to or less than the axial length 60 depending upon the specific application.

The first plate ends 62 and 64 of the side plates 54 and 56 are located at the axial first distal end 42 of the brush seal 26. The bristles 52 are arranged radially between the side plates 54 and 56. The bristles 52 may be secured to each other as well as the side plates 54 and 56 at a joint 70 radially between the side plates 54 and 56. The bristles 52, for example, may be welded, brazed and/or otherwise bonded to each other and/or the side plates 54 and 56. The bristles 52 may also or alternatively be mechanically fastened and/or otherwise connected together as well as to the mount 50.

The bristles 52 are arranged in one or more annular arrays about the centerline 30. The bristles 52, for example, are grouped into at least a first set (e.g., pack) of bristles 72A and a second set (e.g., pack) of bristles 72B. Each of these sets of bristles 72A and 72B (generally referred to as "72") includes at least one of the annular arrays of the bristles 52. More particularly, the first set of bristles 72A includes one or more annular arrays of first bristles 52A and the second set of bristles 72B includes one or more annular arrays of second bristles 52B. Each annular array of bristles includes a row of circumferentially side-by-side bristles 52 that encircles the centerline 30.

Figure 3:
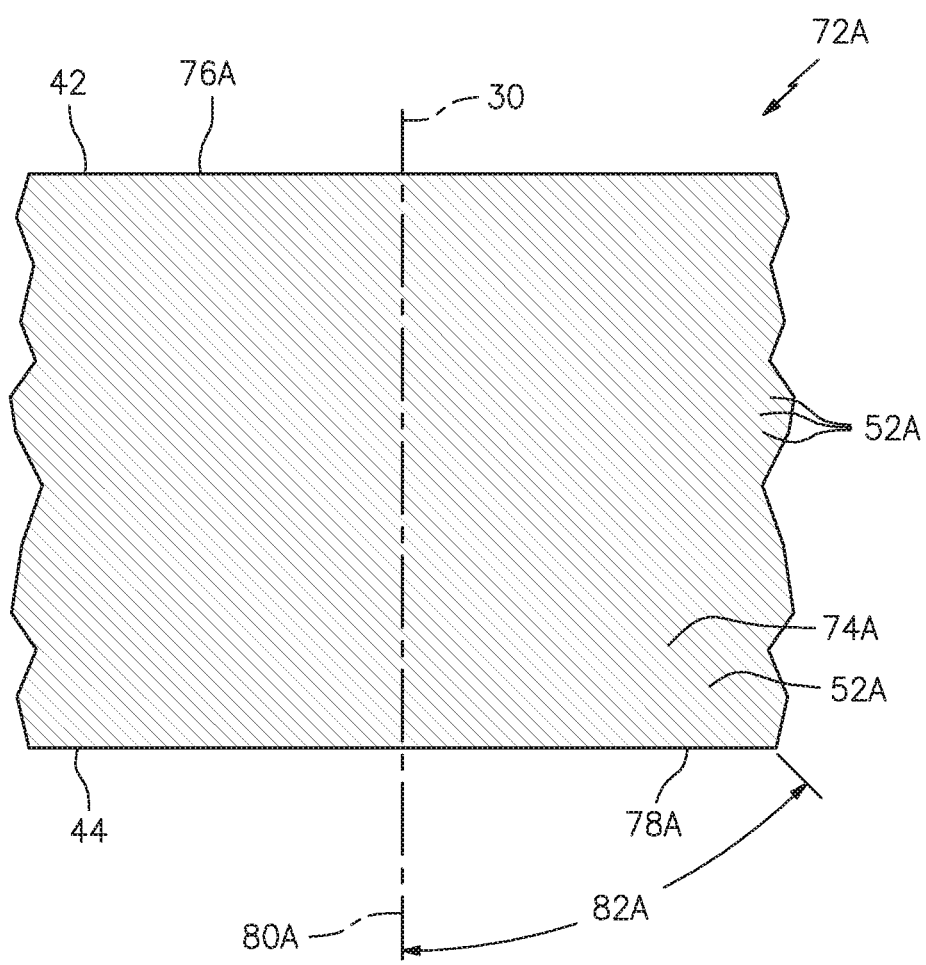
FIG. 3 is an illustration of a portion of a plurality of first bristles.

Referring to FIG. 3, each of the first bristles 52A in the first set of bristles 72A extends longitudinally along a first bristle trajectory 74A between a respective first bristle first end 76A and a first bristle second end 78A. The first bristle first end 76A is located at the axial first distal end 42 of the brush seal 26. The first bristle second end 78A is located at and partially forms the axial second distal end 44 of the brush seal 26. Thus, each first bristle 52A may extend axially from the axial first distal end 42 of the brush seal 26 to the axial second distal end 44 of the brush seal 26.

The first bristle first end 76A and the first bristle second end 78A of each first bristle 52A may be circumferentially skewed (e.g., offset, displaced, etc.) by a circumferential distance about the centerline 30. This skew between the first bristle first and second ends 76A and 78A provides the first bristle trajectory 74A with both an axial component along the centerline 30 as well as a circumferential component about the centerline 30. The first set of bristles 72A are thereby laid in a first circumferential direction (e.g., tilted) about the centerline 30. Each first bristle 52A is thereby angularly offset from a respective reference line 80A by a first bristle lay angle 82A. This reference line 80A may be the centerline 30 or coaxial with the centerline 30. Alternatively, the reference line 80A may be another line that is parallel to the centerline 30 such as, for example, a line that is perpendicular to the seal land surface 41 at a point where the respective first bristle 52A contacts the seal land surface 41; e.g., see FIG. 4.

Figure 4:
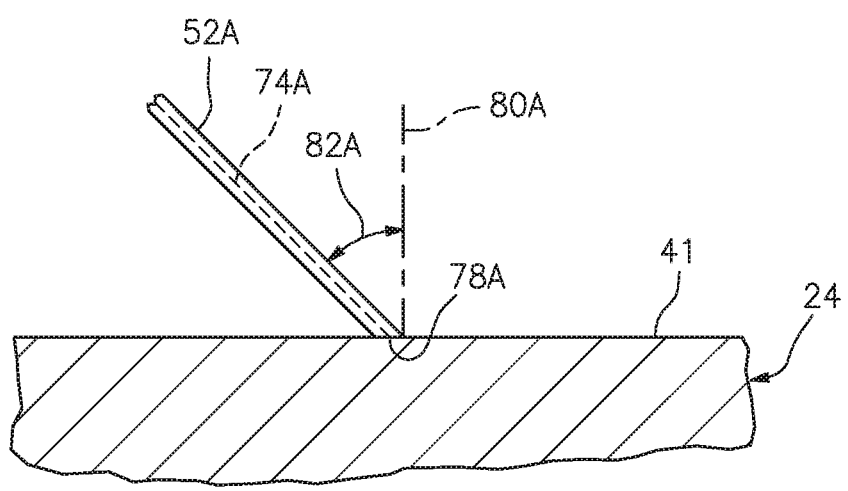
FIG. 4 is an illustration of an exemplary one of the first bristles interfacing a seal land surface.

The first bristle lay angle 82A of FIGS. 3 and 4, is an acute angle that is, for example, between thirty-five degrees (35°) and seventy-five degrees (75°); e.g., between forty-five degrees (45°) and sixty-five degrees (65°). In some embodiments, in particular, the first bristle lay angle 82A may be exactly or about (e.g., +/−1°) forty-seven degrees (47°) or sixty degrees (60°). The present disclosure, of course, is not limited to the foregoing exemplary angles.

Figure 5:
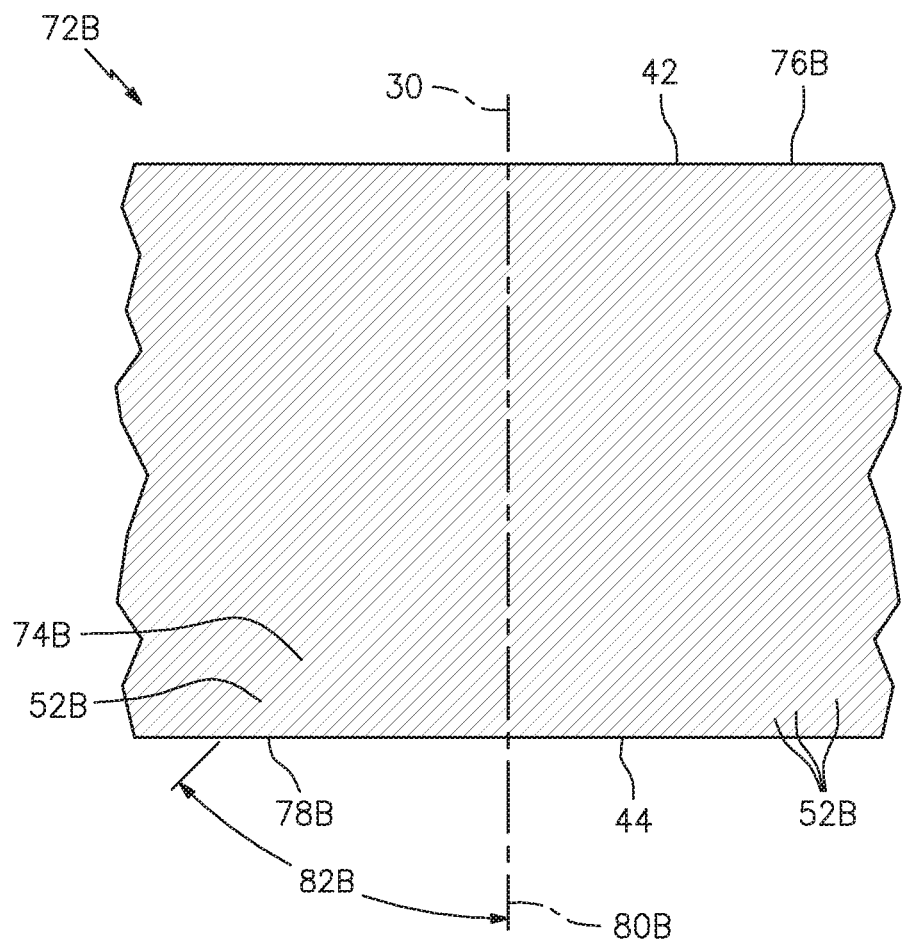
FIG. 5 is an illustration of a portion of a plurality of second bristles.

Referring to FIG. 5, each of the second bristles 52B in the second set of bristles 72B extends longitudinally along a second bristle trajectory 74B between a respective second bristle first end 76B and a second bristle second end 78B. The second bristle first end 76B is located at the axial first distal end 42 of the brush seal 26. The second bristle second end 78B is located at and partially forms the axial second distal end 44 of the brush seal 26. Thus, each second bristle 52B may extend axially from the axial first distal end 42 of the brush seal 26 to the axial second distal end 44 of the brush seal 26.

Figure 6:
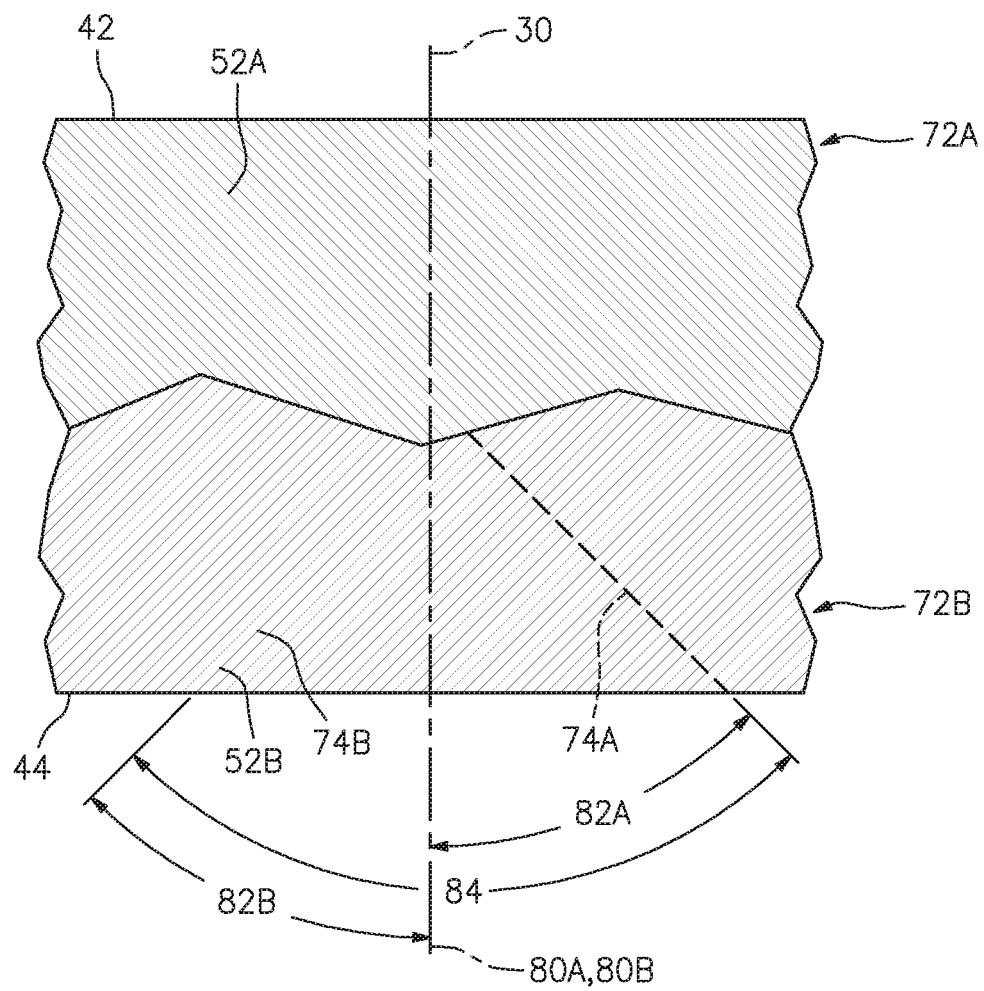
FIG. 6 is a cutaway illustration of a portion of the first bristles overlapping and crossing the second bristles where the first and the second bristles are offset by a right angle.

The second bristle first end 76B and the second bristle second end 78B of each second bristle 52B may be circumferentially skewed by a circumferential distance about the centerline 30, which may be equal to or different than the circumferential distance (see FIG. 3). The skew between the second bristle first and second ends 76B and 78B provides the second bristle trajectory 74B with both an axial component along the centerline 30 as well as a circumferential component about the centerline 30. Referring to FIG. 6, the circumferential component of the second bristle trajectory 74B may be opposite to the circumferential component of the first bristle trajectory 74A. The second set of bristles 72B of FIGS. 5 and 6 therefore are laid in a second circumferential direction (e.g., tilted) about the centerline 30, which second circumferential direction is opposite of the first circumferential direction. Each second bristle 52B is thereby angularly offset from a respective reference line 80B by a second bristle lay angle 82B. The reference line 80B may be or coaxial with the centerline 30. Alternatively, the reference line 80B may be another line that is parallel to the centerline 30 such as, for example, a line that is perpendicular to the seal land surface 41 at a point where the respective second bristle 52B contacts the seal land surface 41; e.g., see FIG. 7.

Figure 7:
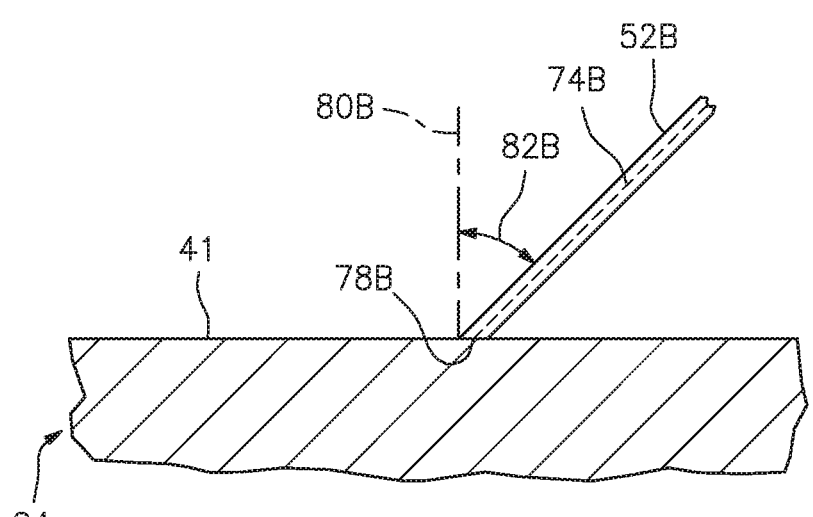
FIG. 7 is an illustration of an exemplary one of the second bristles interfacing the seal land surface.

The second bristle lay angle 82B of FIGS. 5 and 7, is an acute angle that is, for example, between thirty-five degrees (35°) and seventy-five degrees (75°); e.g., between forty-five degrees (45°) and sixty-five degrees (65°). In some embodiments, in particular, the second bristle lay angle 82B may be exactly or about (e.g., +/−1°) forty-seven degrees (47°) or sixty degrees (60°). Referring to FIG. 6, the second bristle lay angle 82B may be equal and opposite the first bristle lay angle 82A. The present disclosure, of course, is not limited to the foregoing exemplary angles or relationship between the lay angles. For example, in other embodiments, the second bristle lay angle 82B may be different than the first bristle lay angle 82A.

With the foregoing arrangement of the bristles 52, each first bristle 52A crosses one or more neighboring second bristles 52B. More particularly, each first bristle 52A circumferentially and axially overlaps one or more neighboring second bristles 52B. Similarly, each second bristle 52B crosses one or more neighboring first bristles 52A. More particularly, each second bristle 52B circumferentially and axially overlaps one or more neighboring first bristles 52A. The second bristles 52B may support/provide a backing for the neighboring first bristles 52A. In addition or alternatively, depending upon a pressure differential across the brush seal 26, the first bristles 52A may thereby support/provide a backing for the neighboring second bristles 52B. The first and the second bristles 52B are thereby operable to load share and as a result increase resistance to brush seal 26 blow through—e.g., bending of the bristles 52 in a radial direction in the embodiment of FIG. 2.

Figure 8:
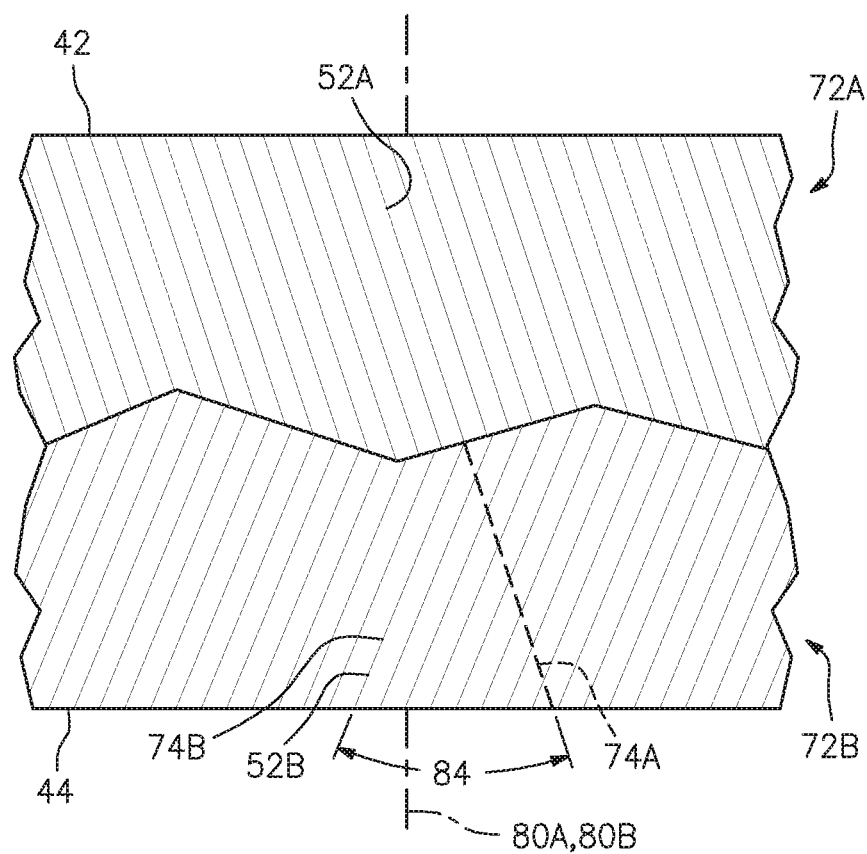
FIG. 8 is a cutaway illustration of a portion of the first bristles overlapping and crossing the second bristles where the first and the second bristles are offset by an acute angle.
Figure 9:
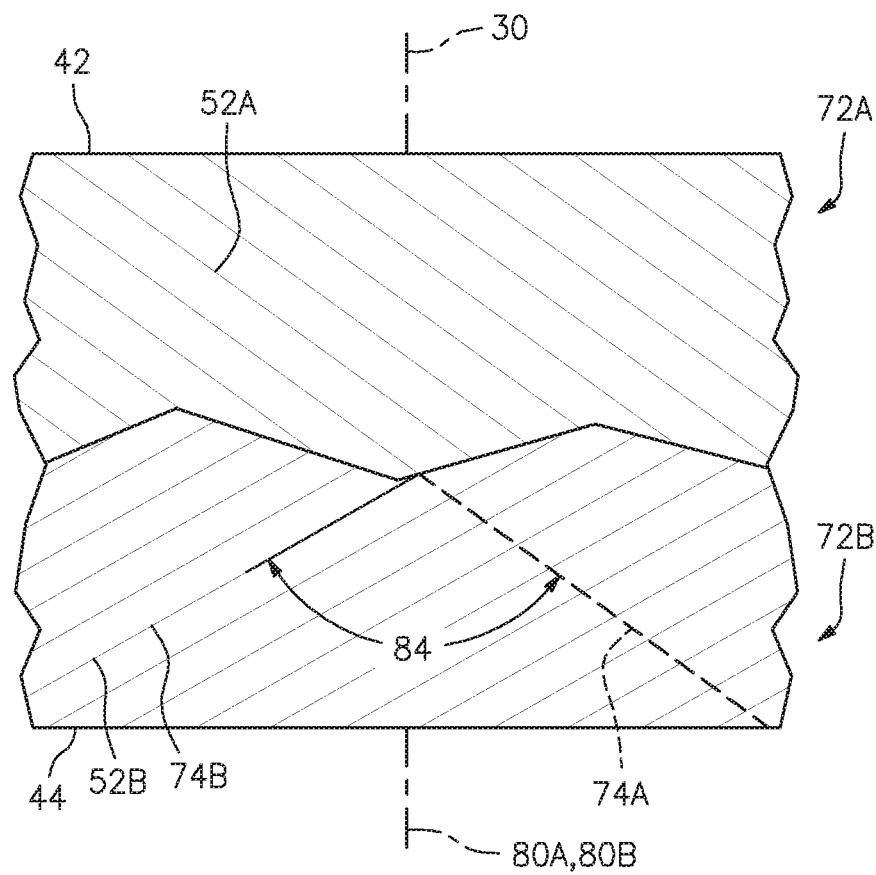
FIG. 9 is a cutaway illustration of a portion of the first bristles overlapping and crossing the second bristles where the first and the second bristles are offset by an obtuse angle.

In the embodiment of FIG. 6, each first bristle 52A is angularly offset from one or more respective neighboring second bristles 52B by an angle 84. This angle 84 may be a right (90°) angle as shown in FIG. 6. The angle 84 may alternatively be an acute angle (e.g., less than 90°, but greater than or equal to 60°) as shown in FIG. 8. The angle 84 may still alternatively be an obtuse angle (e.g., more than 90°, but less than or equal to 120°) as shown in FIG. 9.

Referring again to FIG. 1, the axial first distal end 42 of the brush seal 26 and the mount 50 are received within the notch 32. The axial second distal end 44 of the brush seal 26 and, for example, each of the bristles 52A, 52B engages (e.g., is pressed against and contacts) the seal land surface 41. The brush seal 26 is thereby operable to seal the gap 28 between the seal carrier 22 and the seal land 24.

Figure 10:
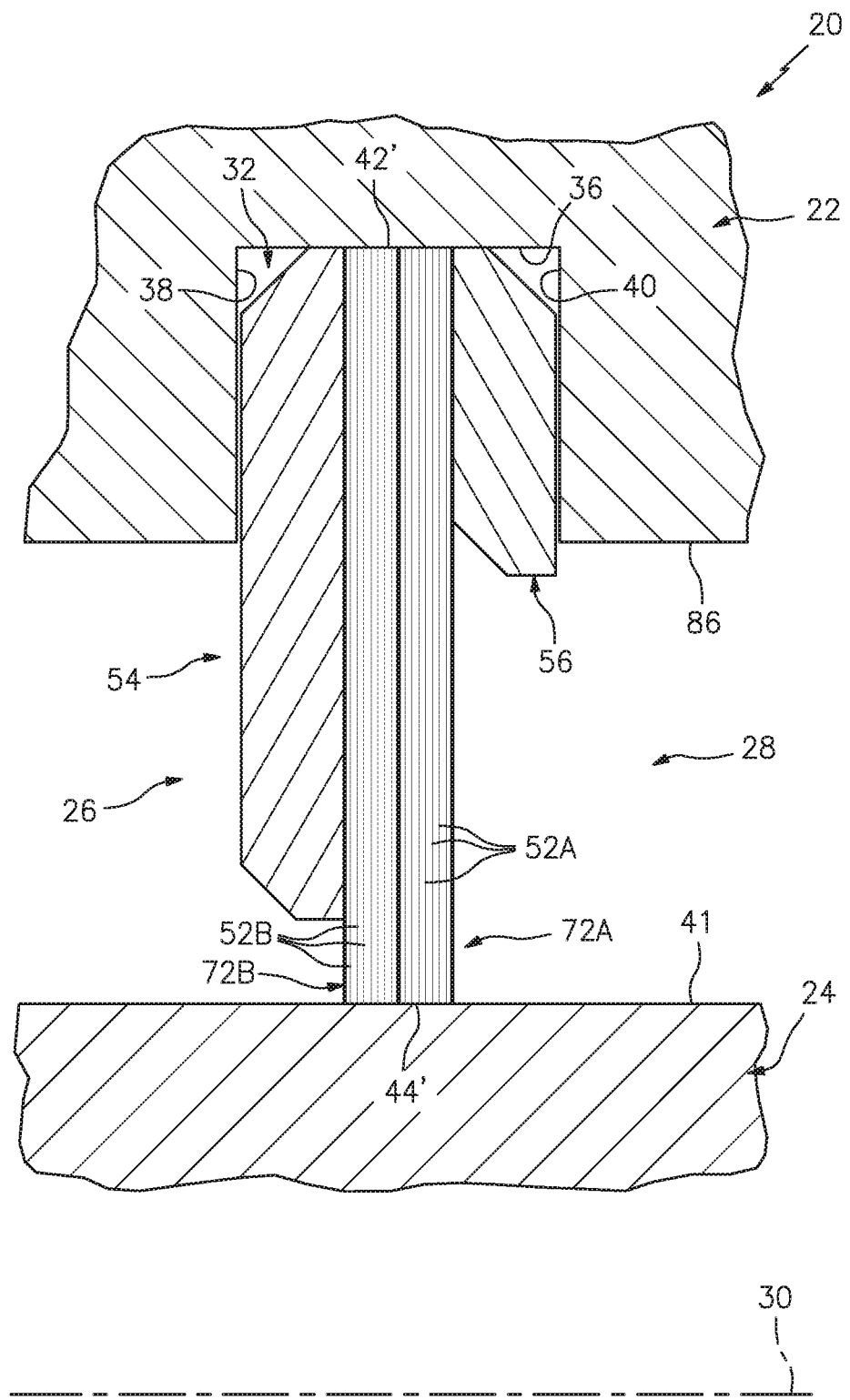
FIG. 10 is a partial side sectional illustration of a seal joint assembly with a radial seal joint.

As described above with respect to FIG. 1, the gap 28 between the seal carrier 22 and the seal land 24 may be an axial gap. The brush seal 26 may thereby extend axially between the seal carrier 22 and the seal land 24 to seal the gap 28. With such an arrangement, the seal joint assembly 20 of FIG. 1 is configured with an axial seal joint. However, in other embodiments, the seal joint assembly 20 may alternatively be configured with a radial seal joint as shown in FIG. 10. The brush seal 26, for example, may extend radially between the seal carrier 22 and the seal land 24 to seal the gap 28, here a radial gap.

The seal joint assembly 20 of FIG. 10 may have a similar configuration to the seal joint assembly 20 of FIG. 1. However, whereas the seal carrier 22 in FIG. 1 is axially next to and radially aligned with the seal land 24, the seal carrier 22 of FIG. 10 is axially aligned with the seal land 24. The seal carrier 22 of FIG. 10, for example, circumscribes the seal land 24. The notch 32 in the seal carrier 22 therefore may extend radially outward into the seal carrier 22 from a radial distal surface 86 (e.g., inner surface) to its notch end surface 36.

To seal the radial gap 28 between the seal carrier 22 and the seal land 24 of FIG. 10, the brush seal 26 is arranged such that the axial first distal end 42 of FIG. 2 becomes a radial first distal end 42' of FIG. 10 (e.g., a radial outer distal end) and the axial second distal end 44 of FIG. 2 becomes a radial second distal end 44' of FIG. 10 (e.g., a radial inner distal end). The bristles 52 are thereby arranged axially between the side plates 54 and 56. In addition, the bristles 52 extend radially between the radial outer distal end 42' of the brush seal 26 and the radial inner distal end 44' of the brush seal 26.

Figure 11:
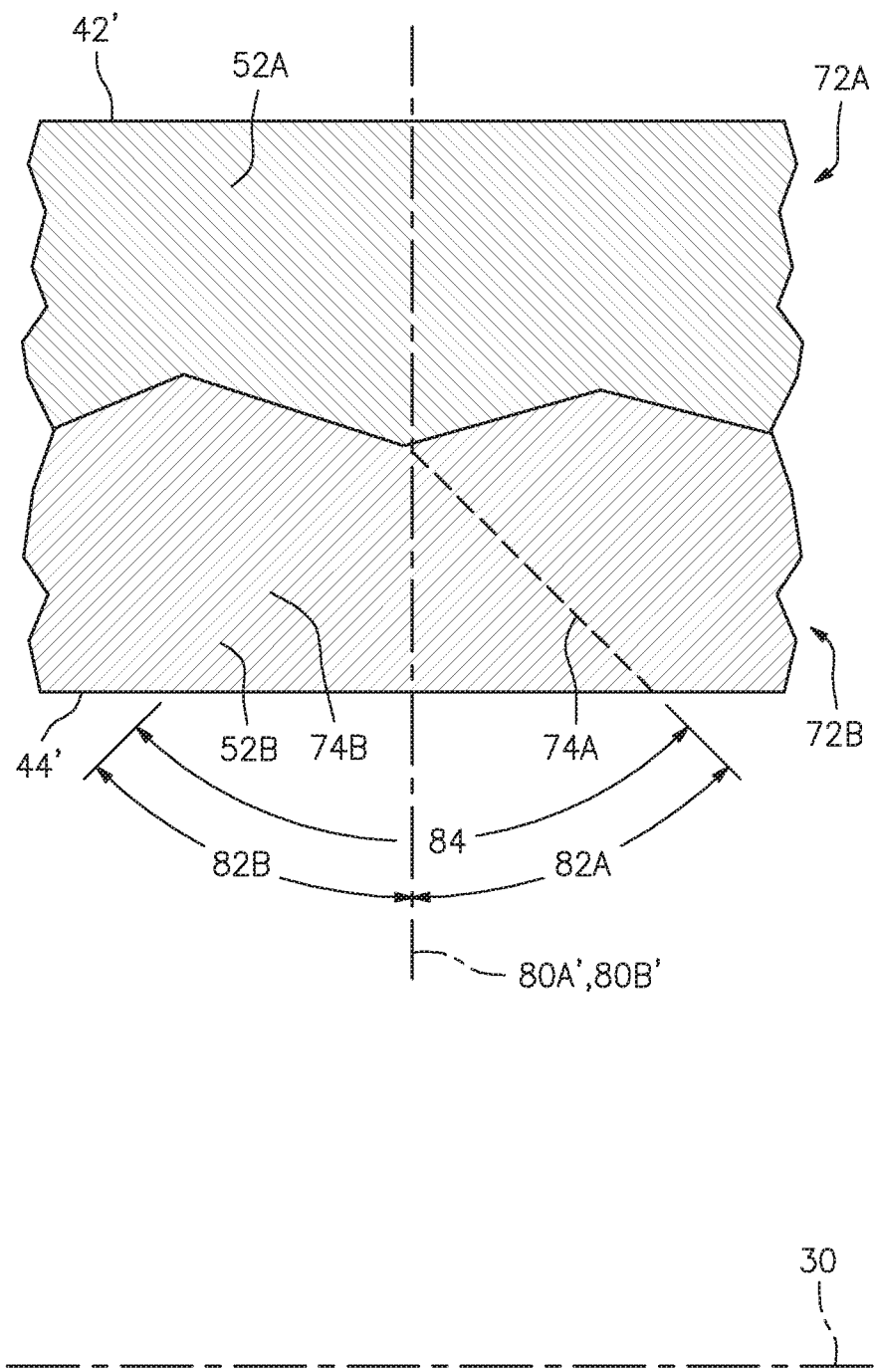
FIG. 11 is a cutaway illustration of a portion of the first bristles overlapping and crossing the second bristles of the seal joint assembly of FIG. 10.

Referring to FIG. 11, the first bristles 52A and the second bristles 52B may still lay in the first and second circumferential directions. However, in the embodiment of FIG. 11, the first bristle trajectory 74A includes a radial component rather than the axial component of FIG. 6. Similarly, the second bristle trajectory 74B include a radial component rather than the axial component of FIG. 6. Each first bristle 52A in FIG. 11 therefore circumferentially and radially overlaps one or more neighboring second bristles 52B. Similarly, each second bristle 52B circumferentially and radially overlaps one or more neighboring first bristles 52A. The first and the second bristles 52A and 52B are thereby operable to load share and as a result increase resistance to brush seal 26 blow through—e.g., bending of the bristles 52 in an axial direction in the embodiment of FIG. 10.

The first bristle lay angle 82A of the embodiment of FIG. 11 may be configured the same as described above. Similarly, the second bristle lay angle 82B of the embodiment of FIG. 11 may be configured the same as described above. However, whereas the reference line 80A, 80B of FIG. 6 is an axial line, the reference line 80A', 80B' of FIG. 11 is a radial line which may be, for example, perpendicular to and/or coincident with the centerline 30.

As described above, the seal carrier 22 and/or the seal land 24 may each be configured as stationary components. Neither the seal carrier 22 nor the seal land 24, for example, may rotate around the centerline 30 during equipment operation. With such an arrangement, the brush seal 26 of FIGS. 1 and 10 are configured for a static application. By contrast, if the brush seal 26 was configured for a dynamic application, the seal carrier 22 and/or the seal land 24 may rotate about the centerline 30 during equipment operation.

Figure 12:
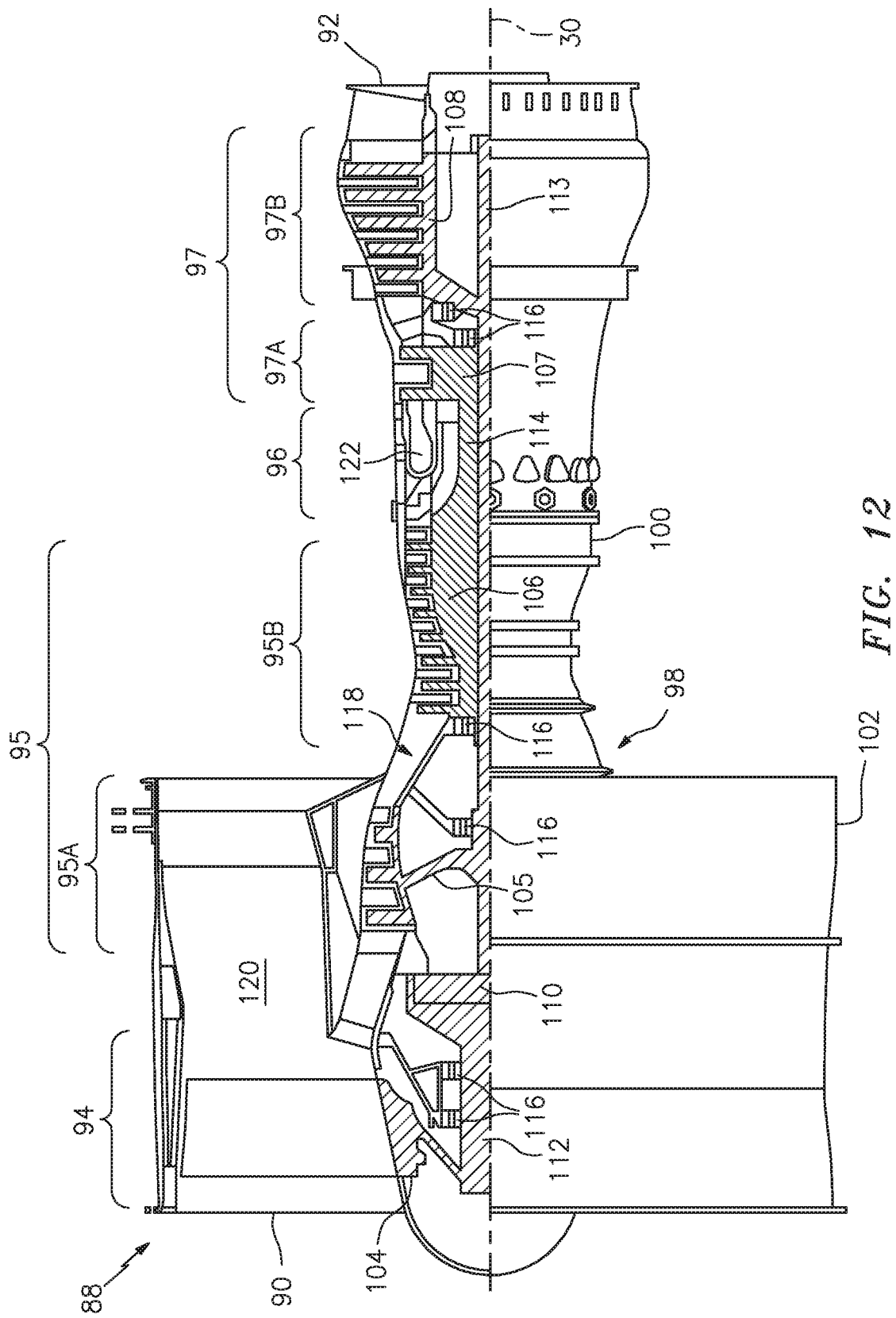
FIG. 12 is a side cutaway illustration of a geared turbine engine.

FIG. 12 is a side cutaway illustration of a geared turbine engine 88 with which the seal joint assembly 20 of FIGS. 1 and 10 may be configured. This turbine engine 88 extends along the centerline 30 between an upstream airflow inlet 90 and a downstream airflow exhaust 92. The turbine engine 88 includes a fan section 94, a compressor section 95, a combustor section 96 and a turbine section 97. The compressor section 95 includes a low pressure compressor (LPC) section 95A and a high pressure compressor (HPC) section 95B. The turbine section 97 includes a high pressure turbine (HPT) section 97A and a low pressure turbine (LPT) section 97B.

The engine sections 94-97 are arranged sequentially along the centerline 30 within an engine housing 98. This housing 98 includes an inner case 100 (e.g., a core case) and an outer case 102 (e.g., a fan case). The inner case 100 may house one or more of the engine sections 95-97; e.g., an engine core. The outer case 102 may house at least the fan section 94.

Each of the engine sections 94, 95A, 95B, 97A and 97B includes a respective rotor 104-108. Each of these rotors 104-108 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 104 is connected to a gear train 110, for example, through a fan shaft 112. The gear train 110 and the LPC rotor 105 are connected to and driven by the LPT rotor 108 through a low speed shaft 113. The HPC rotor 106 is connected to and driven by the HPT rotor 107 through a high speed shaft 114. The shafts 112-114 are rotatably supported by a plurality of bearings 116; e.g., rolling element and/or thrust bearings. Each of these bearings 116 is connected to the engine housing 98 by at least one stationary structure such as, for example, an annular support strut.

During operation, air enters the turbine engine 88 through the airflow inlet 90. This air is directed through the fan section 94 and into a core gas path 118 and a bypass gas path 120. The core gas path 118 extends sequentially through the engine sections 95A-97B. The air within the core gas path 118 may be referred to as "core air". The bypass gas path 120 extends through a bypass duct, which bypasses the engine core. The air within the bypass gas path 120 may be referred to as "bypass air".

The core air is compressed by the compressor rotors 105 and 106 and directed into a combustion chamber 122 of a combustor in the combustor section 96. Fuel is injected into the combustion chamber 122 and mixed with the compressed core air to provide a fuel-air mixture. This fuel air mixture is ignited and combustion products thereof flow through and sequentially cause the turbine rotors 107 and 108 to rotate. The rotation of the turbine rotors 107 and 108 respectively drive rotation of the compressor rotors 106 and 105 and, thus, compression of the air received from a core airflow inlet. The rotation of the turbine rotor 108 also drives rotation of the fan rotor 104, which propels bypass air through and out of the bypass gas path 120. The propulsion of the bypass air may account for a majority of thrust generated by the turbine engine 88, e.g., more than seventy-five percent (75%) of engine thrust. The turbine engine 88 of the present disclosure, however, is not limited to the foregoing exemplary thrust ratio.

The seal joint assembly 20 may be included in various turbine engines other than the one described above as well as in other types of rotational and non-rotational equipment. The seal joint assembly 20, for example, may be included in a geared turbine engine where a gear train connects one or more shafts to one or more rotors in a fan section, a compressor section and/or any other engine section. Alternatively, the seal joint assembly 20 may be included in a turbine engine configured without a gear train. The seal joint assembly 20 may be included in a geared or non-geared turbine engine configured with a single spool, with two spools (e.g., see FIG. 12), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A seal joint assembly, comprising:
   a stationary seal carrier;
   a stationary seal land comprising a seal land surface; and
   a brush seal mounted to the stationary seal carrier, the brush seal comprising a first plate, a second plate, a first set of bristles and a second set of bristles;
   the first set of bristles and the second set of bristles secured at a joint between the first plate and the second plate;
   the first set of bristles adjacent and contacting the first plate, and the first set of bristles including a first bristle that contacts the seal land surface; and
   the second set of bristles adjacent and contacting the second plate, the second set of bristles including a second bristle that contacts the seal land surface, and the second bristle crossing the first bristle.

2. The seal joint assembly of claim 1, wherein
   the brush seal extends circumferentially about a centerline; and
   the second bristle circumferentially and axially overlaps the first bristle relative to the centerline.

3. The seal joint assembly of claim 1, wherein
   the brush seal extends circumferentially about a centerline; and
   the second bristle circumferentially and radially overlaps the first bristle relative to the centerline.

4. The seal joint assembly of claim 1, wherein the second bristle is angularly offset from the first bristle by an acute angle.

5. The seal joint assembly of claim 1, wherein the second bristle is angularly offset from the first bristle by an obtuse angle.

6. The seal joint assembly of claim 1, wherein the second bristle is angularly offset from the first bristle by a right angle.

7. The seal joint assembly of claim 1, wherein
   the brush seal extends circumferentially about a centerline;
   the first set of bristles are laid in a first circumferential direction about the centerline; and
   the second set of bristles are laid in a second circumferential direction about the centerline that is opposite the first circumferential direction.

8. The seal joint assembly of claim 7, wherein
   the first bristle is laid in the first circumferential direction about the centerline with a first bristle lay angle; and
   the second bristle is laid in the second circumferential direction about the centerline with a second bristle lay angle that is equal to and opposite of the first bristle lay angle.

9. The seal joint assembly of claim 1, wherein
   the brush seal extends circumferentially about a centerline; and
   the brush seal is axially between the stationary seal carrier and the stationary seal land.

10. The seal joint assembly of claim 1, wherein
    the brush seal extends circumferentially about a centerline;
    the brush seal is radially between the stationary seal carrier and the stationary seal land; and
    the stationary seal carrier circumscribes the stationary seal land.

11. The seal joint assembly of claim 1, further comprising:
    a first component of a gas turbine engine, the first component comprising the stationary seal carrier; and
    a second component of the gas turbine engine, the second component comprising the stationary seal land.

12. A brush seal, comprising:
    a bottom plate extending circumferentially around a centerline;
    a top plate extending circumferentially around the centerline and circumscribing the bottom plate; and
    a plurality of bristles secured at a joint radially between the bottom plate and the top plate, the plurality of bristles including a first set of bristles and a second set of bristles;
    the first set of bristles extending in one direction toward a seal land, the first set of bristles including a first bristle that extends to an axial distal end of the brush seal; and
    the second set of bristles extending in the one direction toward the seal land, the second set of bristles including a second bristle that extends to the axial distal end of the brush seal, the second bristle circumferentially and axially overlapping the first bristle relative to the centerline, and the second bristle angularly offset from the first bristle by an angle.

13. The brush seal of claim 12, wherein the angle is an acute angle.

14. The brush seal of claim 12, wherein the angle is an obtuse angle.

15. The brush seal of claim 12, wherein the angle is a right angle.

16. The brush seal of claim 12, wherein
    the first set of bristles are laid in a first circumferential direction about the centerline; and the second set of bristles are laid in a second circumferential direction about the centerline that is opposite the first circumferential direction.

17. The brush seal of claim 16, wherein the first bristle is laid in the first circumferential direction about the centerline with a first bristle lay angle; and the second bristle is laid in the second circumferential direction about the centerline with a second bristle lay angle that is equal to and opposite of the first bristle lay angle.

18. A brush seal, comprising:

a first side plate extending circumferentially around a centerline;

a second side plate extending circumferentially around the centerline; and a plurality of bristles disposed, axially along the centerline, between and secured to the first side plate and the second side plate, the plurality of bristles including a first set of bristles and a second set of bristles;

the first set of bristles including a first bristle that extends to a radial inner distal end of the brush seal and contact a seal land; and the second set of bristles including a second bristle that extends to the radial inner distal end of the brush seal and contact the seal land, the second bristle circumferentially and radially overlapping the first bristle relative to the centerline, and the second bristle angularly offset from the first bristle by an angle.

19. The brush seal of claim 18, wherein each bristle in the first set of bristles is laid in a first circumferential direction about the centerline at a first bristle lay angle; and each bristle in the second set of bristles is laid in a second circumferential direction about the centerline at a second bristle lay angle that is equal to and opposite of the first bristle lay angle.

20. The brush seal of claim 18, wherein the first side plate and the second side plate are arranged at a radial outer end of the brush seal relative to the centerline.

* * * * *